Oct. 5, 1954  J. L. GARZA  2,690,635
COMBINATION TRAILER, HARROW, AND GRADER FARM TOOL
Filed Sept. 19, 1949  3 Sheets-Sheet 1

Inventor
JOSEPH L. GARZA
By Gustave Miller
Attorney

Oct. 5, 1954          J. L. GARZA          2,690,635

COMBINATION TRAILER, HARROW, AND GRADER FARM TOOL

Filed Sept. 19, 1949          3 Sheets-Sheet 2

Inventor

JOSEPH L. GARZA

By Gustave Miller

Attorney

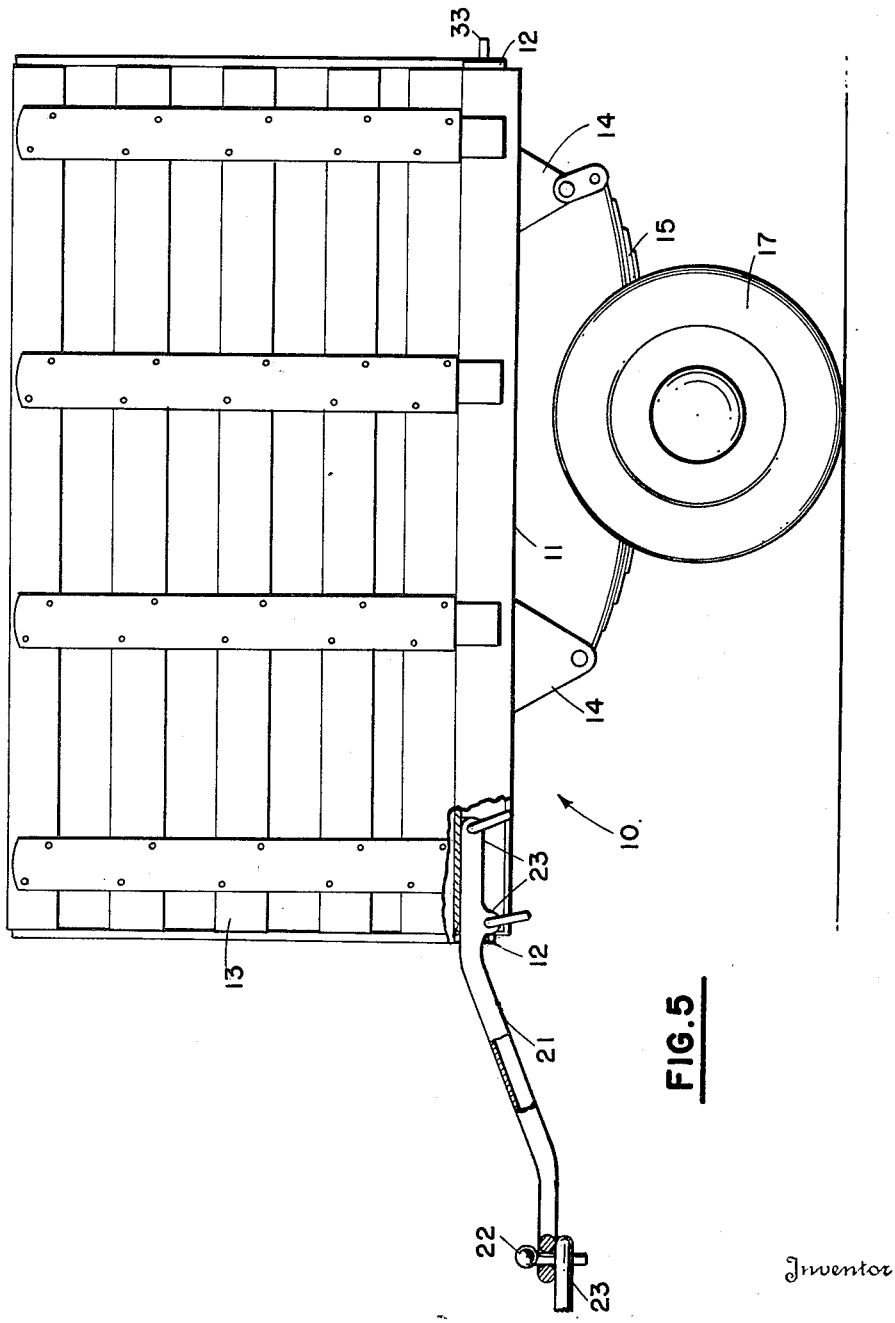

Patented Oct. 5, 1954

2,690,635

UNITED STATES PATENT OFFICE 2,690,635

COMBINATION TRAILER, HARROW, AND GRADER FARM TOOL

Joseph L. Garza, Indianapolis, Ind.

Application September 19, 1949, Serial No. 116,461

6 Claims. (Cl. 55—23)

This invention relates to a combination trailer, harrow and grader, and has for an object to provide a farm tool readily and interchangeably convertible to any one of three farm uses, either as a vehicle for transportation purposes, or for temporary storage purposes, or for use as a harrow, cultivator or drag, for cultivating the earth to a depth as much as five inches and to simultaneously cut up any lumps to sizes no larger than one inch and a quarter, or for use as a grader, leveler or drag to level the ground smooth and flat in preparation for fine seed planting such as clover, lawns, golf courses and the like.

A further object of this invention is to provide a combination farm tool which may be used as a trailer for the transportation of grain, logs, hay, live stock and general trucking by the use of appropriate side boards or stakes, or even for storage of farm products such as corn, thereby providing a corn crib up to 200 bushels. It also serves to transport itself to the fields for use as a harrow or grader, and serves to carry other farm tools to and from the field.

With the foregoing and other objects in view, as will hereinafter become apparent, this invention comprises the combinations, constructions and arrangements or parts hereinafter set forth, disclosed, claimed and illustrated on the accompanying drawings, wherein, Fig. 1 is a plan view of the invention used as a leveler or grader.

Fig. 5 is a side plan view of the invention used as a trailer vehicle.

Figure 1:
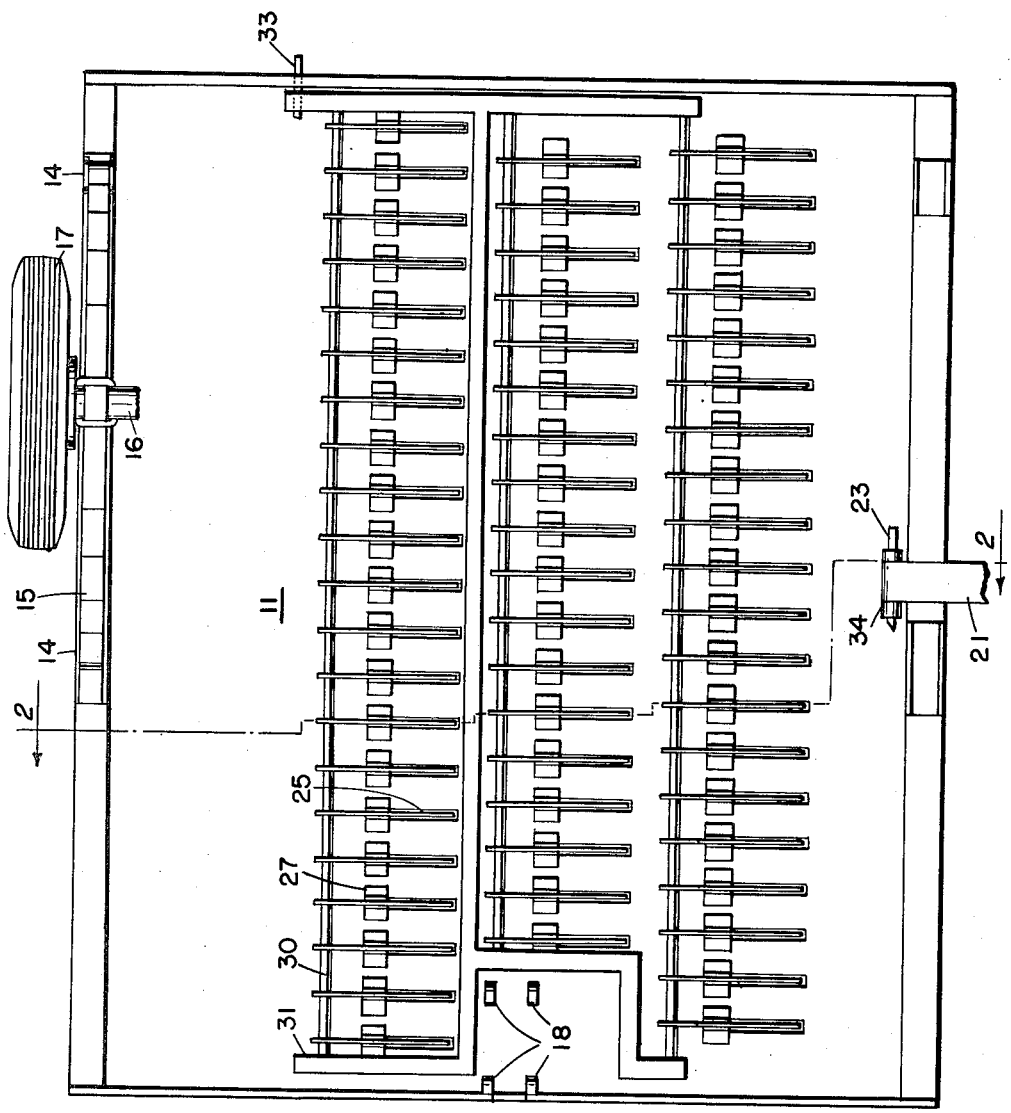

There is shown at 10 the combination trailer, harrow and grader farm tool of this invention, the principal inventive feature of which resides in the floor plate 11. Aside from the floor plate 11, the tool resembles a conventional farm trailer vehicle as shown in Fig. 5, wherein the floor plate 11 is provided along its edge with twelve conventional stake pockets 12 to receive and support conventional stakes or side boards 13 on all four edges as desired. Extending from the long bottom opposite side edges are a pair of support members 14 to receive and support vehicle leaf springs 15 on which is conventionally secured an axle 16 for the vehicle wheels 17. The axle 16 is supported somewhat to the rear of the center of the floor plate, and at the front of the floor plate, on the bottom thereof is provided two pair of hitch post pin receiving eyes 18 to receive the hitch post pins 20 when the hitch post 21 is secured thereto for attaching it by a draw pin 22 to the draw bar 23 of a tractor or other towing vehicle.

The floor plate 11 consists preferably of a steel plate one quarter of an inch thick, ninety six inches by forty eight inches with depending four inch sides. Extending parallel to one of the longer sides are three rows of slots 24 seven inches long by three eighths of an inch wide, the individual slots extending at right angles to the direction of the rows, and the slots of each row being in staggered relation to the slots of the other two rows. With the plate and slots of the dimensions given, there would preferably be fifty nine slots arranged as shown.

Figure 4:
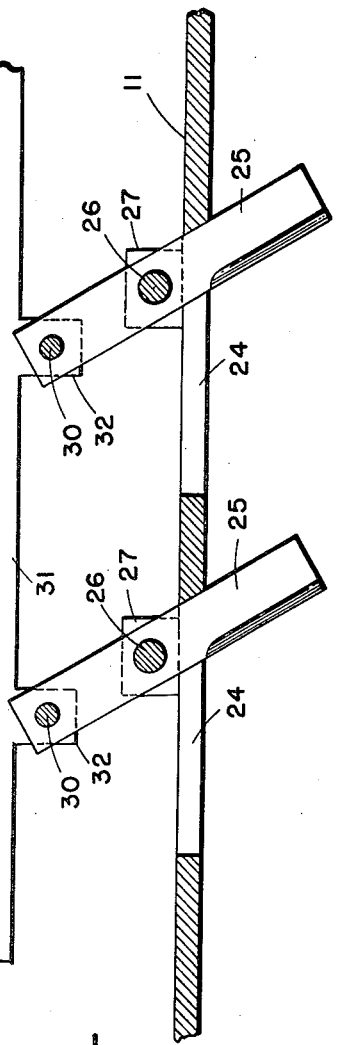
Fig. 4 is a similar view with the teeth projecting for cultivator use.

A blade 25 is provided for each of the slots 24, the blade 25 being eight and one half inches long by two inches wide by a quarter of an inch thick. Each blade 25 is pivoted on a clevis pin 26 secured through a pair of angle plates 27 welded or otherwise secured appropriately on opposite sides of the slot 24 so that the blade 25 when in harrowing position, as shown in Fig. 4 has pivoted through more than 90° and less than 180° and is held in such position by abutting the rear wall 28 of the slot 24, which rear wall 28 may be appropriately angled as shown.

Figure 3:
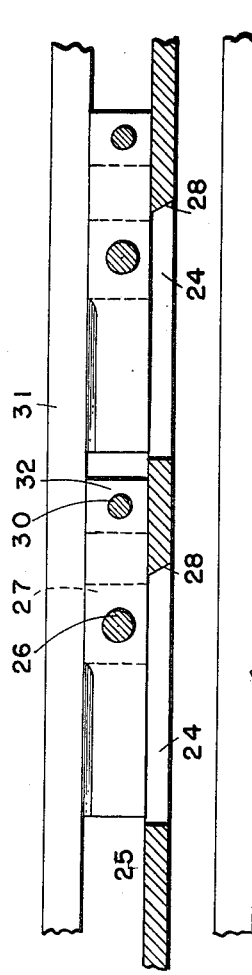
Fig. 3 is a detail view with the teeth retracted for grader use.

In order to control the position of the blades 25, a control rod 30, of suitable length, is provided for each of the three rows of blades 25 and is inserted through a suitable aperture in the inner end of each blade. Then, the end of each control rod 30 is secured in a common control frame 31 provided with offset bosses 32 into which the rods 30 are secured, that the blades 25 may be pivoted to the flat position against the bottom of the plate 11 as shown in Fig. 3. A locking pin 33 may be secured through a depending side edge of plate 11 into the control frame 31 to hold the blades in retracted position, as when used either as a grader or as a trailer.

A pair of hitch post pin eyes 34 are provided on the longer angled side 35 of the plate 11 near the slots 24 to receive another hitch post pin 23 to pivotally secure the end of the hitch post channel member 22 when using the tool as a harrow or grader.

In operation, the combination vehicle trailer, harrow and grader farm tool when used as a vehicle trailer will be assembled in the position shown in Fig. 5, with the blades held in retracted position against the bottom of the floor plate 11 and generally concealed by the four inch depending sides of the floor plate. The hitch post 21 is rigidly secured by the two pins to the two pairs of pin eyes 18, thus making a rigid connection between the channel bar hitch post 21 and the floor plate 11 and enabling the trailer to be towed about behind a tractor and carrying any desired suitable cargo therein.

Figure 2:
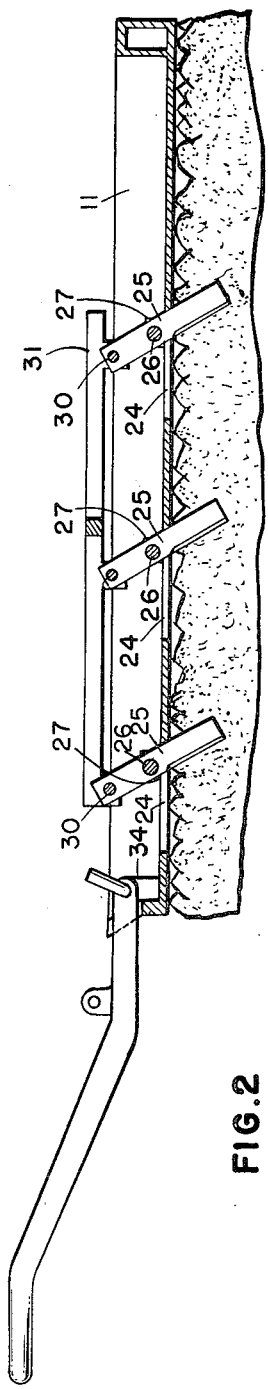
Fig. 2 is a view on line 2—2 of Fig. 1, with the device inverted but for use as a harrow or cultivator.

When the tool is to be used as a harrow or grader, it is first towed to the desired location in trailer form. Then the stakes or side boards 13 and any cargo is removed, and the floor plate 11 is turned upside down, preferably over the back end. The hitch post 21 is then removed from its rigid position at the front of the floor plate 11 and is pivotally attached by a pin 23 to the single pair of eyes 34 along the angled side 35 near the slots. With the blades still in retracted position, held there by the locking pin 33, it is ready for use as a grader. To use it as a harrow, the locking pin 33 is removed, and the control frame 31 is lifted to the position shown in Figs. 2 and 4, causing the blades 25 to be extended through the slots 24 as shown. To facilitate so positioning the blades, the harrow tool may be pulled forward slightly as the blades are being pivoted, and to help retract the blades, it may be pushed backward. When used as a grader, or as a trailer, the blades will preferably be locked in retracted position by the locking pin 33. When used as a harrow, the very act of drawing the harrow tool forwardly will hold the blades in harrowing position. The wheels and axle are left in position when used as a harrow or grader, and thus add to the weight of the steel floor plate and help make it very effective for either use.

Since certain further changes can be made in the foregoing constructions, and different embodiments of the invention may be made without departing from the scope of what is hereinafter claimed, it is intended that all matter and dimensions shown in the accompanying drawings or described hereinbefore shall be interpreted as illustrative and not in a limiting sense.

I claim:

1. A combination trailer vehicle, harrow and grader farm tool comprising a reversible rectangular plate, vehicle wheel supporting means mounted on the bottom side of said plate, means for removably attaching a hitch post to said plate, said plate having a plurality of rows of slots extending therethrough, the slots of each row being in staggered relation to the slots of another row, a plurality of harrow blades, means for pivoting said harrow blades to said bottom side of said plate with each blade arranged to be extended through or be retracted from an individual slot to the top side of said plate, and a frame securing a plurality of said blades together for simultaneous movement between extended and retracted positions, whereby said tool may be used and supported by said wheel means as a vehicle in upright position, or said tool may be used bottom side up as a harrow with said blades extended through said slots, or bottom side up as a grader with said blades in retracted position.

2. A combination trailer vehicle, harrow and grader farm tool comprising a reversible rectangular plate, vehicle wheel supporting means extending from the bottom of said plate, means for removably attaching a hitch post to a short side of said plate to pull said tool as a vehicle, said plate having a plurality of rows of slots extending therethrough, the slots of each row being in staggered relation to the slots of another row, said rows extending parallel and nearer to one long side of said plate, a plurality of harrow blades, means for pivoting said harrow blades to the bottom of said plate with each blade arranged to be extended through or be retracted from an individual slot, a frame securing a plurality of said blades together for simultaneous movement between extended and retracted positions, and means for removably pivoting a hitch post to the long side of said plate near said rows of slots, whereby said tool may be used as a vehicle in upright position with the hitch post attached in vehicle pulling position, or said tool may be used as a harrow with said plate bottom side up, the hitch post attached to said long side, and said blades extended through said slots, or as a grader with said blades in retracted position.

3. A combination trailer vehicle, harrow and grader farm tool comprising a reversible rectangular plate, means arranged along the plate edges to removably support vehicle side members thereon, vehicle wheel supporting means extending from the bottom of said plate, means for removably attaching a hitch post to a short side of said plate to pull said tool as a vehicle, said plate having a plurality of rows of slots extending therethrough, the slots of each row being in staggered relation to the slots of another row, said rows extending parallel and nearer to one long side of said plate, a plurality of harrow blades, means for pivoting said harrow blades to the bottom of said plate with each blade arranged to be extended through or be retracted from an individual slot, a frame securing a plurality of said blades together for simultaneous movement between extended and retracted positions, means for locking said frame with said blades in retracted position, and means for removably pivoting a hitch post to the long side of said plate near said rows of slots, whereby said tool may be used as a vehicle in upright position with the hitch post attached in vehicle pulling position, or said tool may be used as a harrow with said plate bottom side up, the hitch post attached to said long side, and said blades extended through said slots, or as a grader with said blades in retracted position.

4. For use in a combination trailer vehicle harrow or grader farm tool, a substantially rectangular plate having a plurality of rows of slots, said rows of slots being closer to one longer side of the plate than the other, the individual slots extending at right angles to said longer side, the slots in one row being in staggered relation with the slots of another row, means arranged to pivotally secure a plurality of harrow blades to the bottom surface of said plate, with the blades arranged to extend through the slots through the top surface of said plate when in pivotally extended position, trailer vehicle wheels mounted on the bottom surface of said plate, and control means arranged to extend and retract a plurality of said blades simultaneously.

5. For use in combination trailer vehicle, harrow or grader farm tool, a substantially rectangular plate having a plurality of rows of slots, said rows of slots being closer to one longer side of the plate than the other, the individual slots extending at right angles to said longer side, the slots in one row being in staggered relation with the slots of another row, means arranged to pivotally secure a plurality of harrow blades to one surface of said plate, with the blades arranged to extend through the slots when in pivotally extended position, control means arranged to extend and retract a plurality of said blades entirely through said surface simultaneously, and means arranged to mount vehicle wheels on the opposite side of said plate.

6. For use in a combination trailer vehicle, harrow or grader farm tool, a substantially rectangular plate having a plurality of rows of slots, said rows of slots being closer to one longer side of the plate than the other, the individual slots extending at right angles to said longer side, the slots in one row being in staggered relation with the slots of another row, means arranged to pivotally secure a plurality of harrow blades to the bottom surface of said plate with the blades arranged to extend through the slots and through the top surface when in pivotally extended position, control means arranged to extend and retract a plurality of said blades simultaneously, locking means to secure said control means with said blades in retracted position, means arranged to mount vehicle wheels on said bottom surface of said plate, means arranged to rigidly secure a hitch post to one short end of said plate for trailer use, and means arranged to pivotally secure a hitch post to the longer side near the slots for harrow and grader use.

References Cited in the file of this patent

UNITED STATES PATENTS

| Number | Name | Date |
|---|---|---|
| 73,626 | Miller | June 21, 1868 |
| 516,412 | Tigner | Mar. 13, 1894 |
| 979,312 | Kindel | Dec. 20, 1910 |
| 1,112,499 | Vieira | Oct. 6, 1914 |
| 1,418,164 | Piper | May 30, 1922 |
| 2,259,179 | Lockridge | Oct. 14, 1941 |